(12) United States Patent
Grieve

(10) Patent No.: US 10,974,554 B2
(45) Date of Patent: Apr. 13, 2021

(54) TRAILER TOW ASSIST APPARATUS AND METHOD

(71) Applicant: Dennis Grieve, Star, ID (US)

(72) Inventor: Dennis Grieve, Star, ID (US)

( * ) Notice: Subject to any disclaimer, the term of this patent is extended or adjusted under 35 U.S.C. 154(b) by 0 days.

(21) Appl. No.: 16/164,705

(22) Filed: Oct. 18, 2018

(65) Prior Publication Data
US 2019/0111743 A1    Apr. 18, 2019

Related U.S. Application Data

(60) Provisional application No. 62/573,757, filed on Oct. 18, 2017.

(51) Int. Cl.
| | |
|---|---|
| *B60S 9/18* | (2006.01) |
| *B60D 1/46* | (2006.01) |
| *B60D 1/66* | (2006.01) |
| *B60D 1/06* | (2006.01) |
| *B60D 1/24* | (2006.01) |
| *B60D 1/36* | (2006.01) |
| *B60D 1/62* | (2006.01) |
| *B60D 1/58* | (2006.01) |
| *B60D 1/00* | (2006.01) |

(52) U.S. Cl.
CPC ............... *B60D 1/065* (2013.01); *B60D 1/06* (2013.01); *B60D 1/246* (2013.01); *B60D 1/36* (2013.01); *B60D 1/62* (2013.01); *B60D 1/665* (2013.01); *B60S 9/18* (2013.01); *B60D 1/583* (2013.01); *B60D 2001/001* (2013.01); *B60D 2001/005* (2013.01)

(58) Field of Classification Search
CPC ........ B60D 1/065; B60D 1/245; B60D 1/246; B60D 1/248; B60D 1/1665; B60S 9/18
See application file for complete search history.

(56) References Cited

U.S. PATENT DOCUMENTS

| | | | |
|---|---|---|---|
| 2,444,305 A | 6/1948 | Milhizer | |
| 3,861,482 A * | 1/1975 | Stephens | ................. B60L 50/60 180/13 |
| 3,865,405 A | 2/1975 | Mitchell et al. | |
| 5,083,383 A * | 1/1992 | Heger | ...................... G01C 9/20 33/366.19 |
| 5,282,605 A * | 2/1994 | Sauber | ..................... B60D 1/66 254/420 |
| 6,213,491 B1 | 4/2001 | Southard, Jr. | |
| 6,685,211 B2 | 2/2004 | Iles | |
| 6,991,050 B1 | 1/2006 | Sanford et al. | |
| 7,621,554 B1 | 11/2009 | Cremer | |
| 7,786,883 B1 * | 8/2010 | Davison, III | ............. B60P 3/36 33/366.11 |
| 8,840,129 B2 * | 9/2014 | Edgeller | ................ B60D 1/155 254/420 |

(Continued)

*Primary Examiner* — Tony H Winner
(74) *Attorney, Agent, or Firm* — AP Patents

(57) ABSTRACT

A trailer tow assist apparatus comprises a screw and nut drive with a housing, an actuation member coupled to a screw, a wheel assembly, a rigid member upstanding on said wheel assembly and a compressible and resilient member mounted within the housing in a contact with rigid member. A mounting member is provided for attaching the housing to the trailer frame or tow bar. The housing and the mounting member can be adapted with apertures for height adjustment purposes.

20 Claims, 5 Drawing Sheets

(56) References Cited

U.S. PATENT DOCUMENTS

| | | | |
|---|---|---|---|
| 2002/0171224 A1* | 11/2002 | Iles | B60D 1/665 |
| | | | 280/476.1 |
| 2007/0029756 A1* | 2/2007 | Quargerg | B60D 1/143 |
| | | | 280/447 |
| 2009/0108147 A1 | 4/2009 | Di Biase | |
| 2009/0236578 A1* | 9/2009 | Nirenberg | B60D 1/248 |
| | | | 254/420 |
| 2010/0187489 A1* | 7/2010 | Hebert | B60D 1/246 |
| | | | 254/420 |
| 2011/0253954 A1 | 10/2011 | Fortner | |
| 2014/0367625 A1* | 12/2014 | Arakelian | B60D 1/665 |
| | | | 254/418 |
| 2015/0197125 A1* | 7/2015 | Kemper | B60D 1/46 |
| | | | 280/446.1 |
| 2017/0137239 A1* | 5/2017 | Kimener | B60D 1/665 |

* cited by examiner

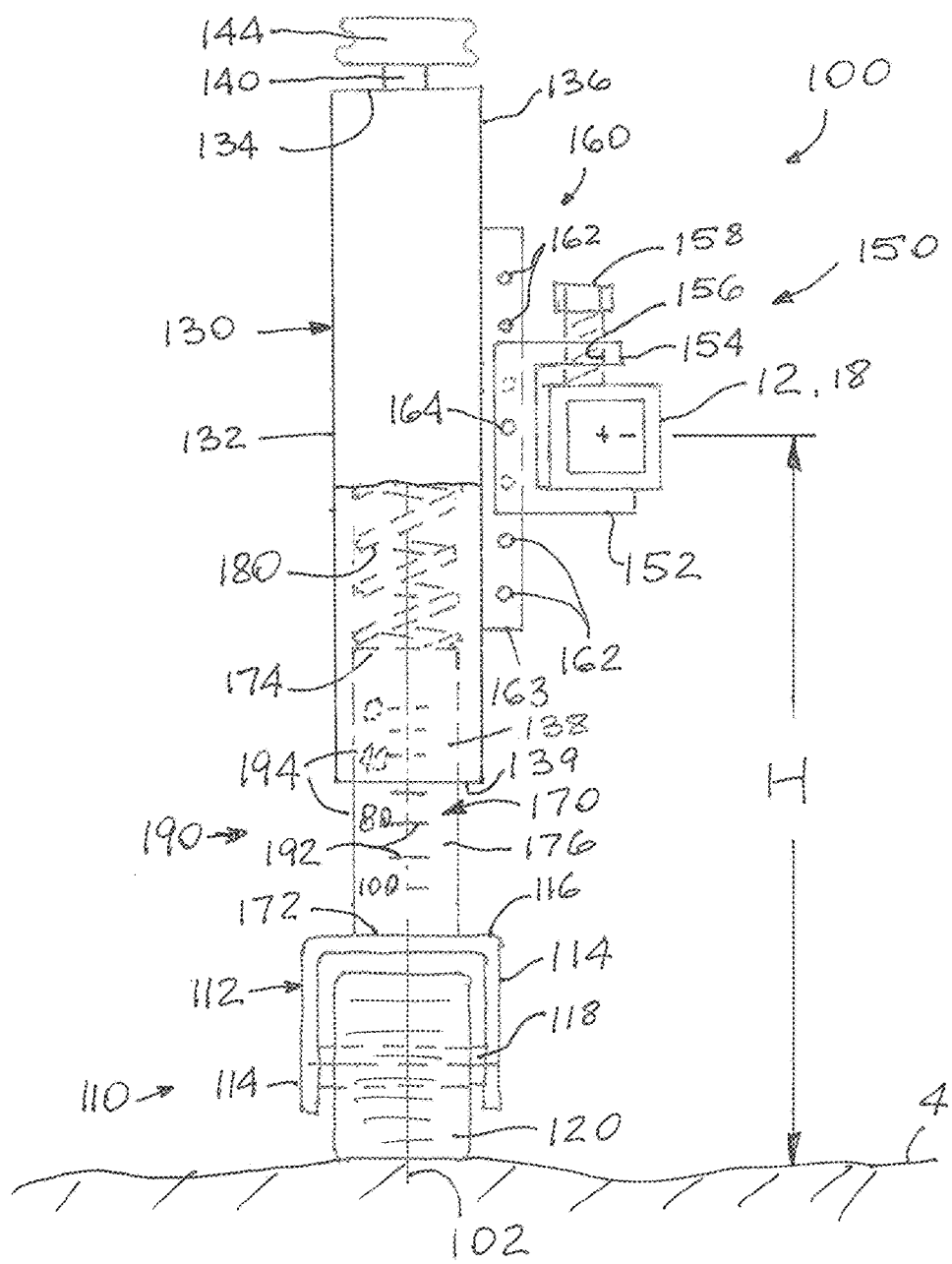

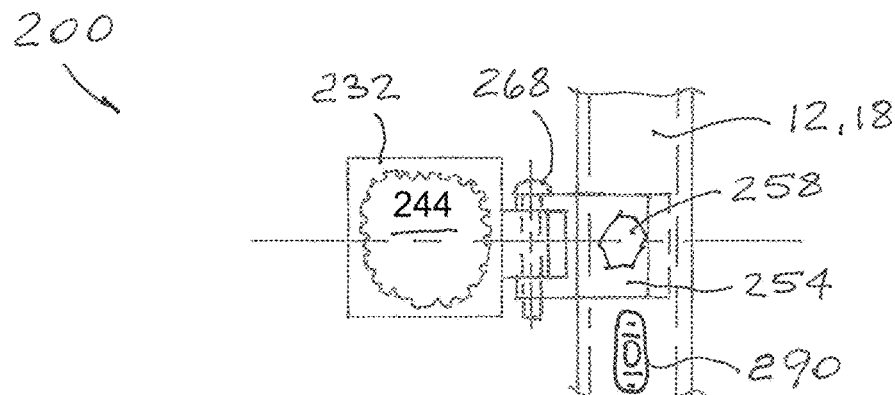
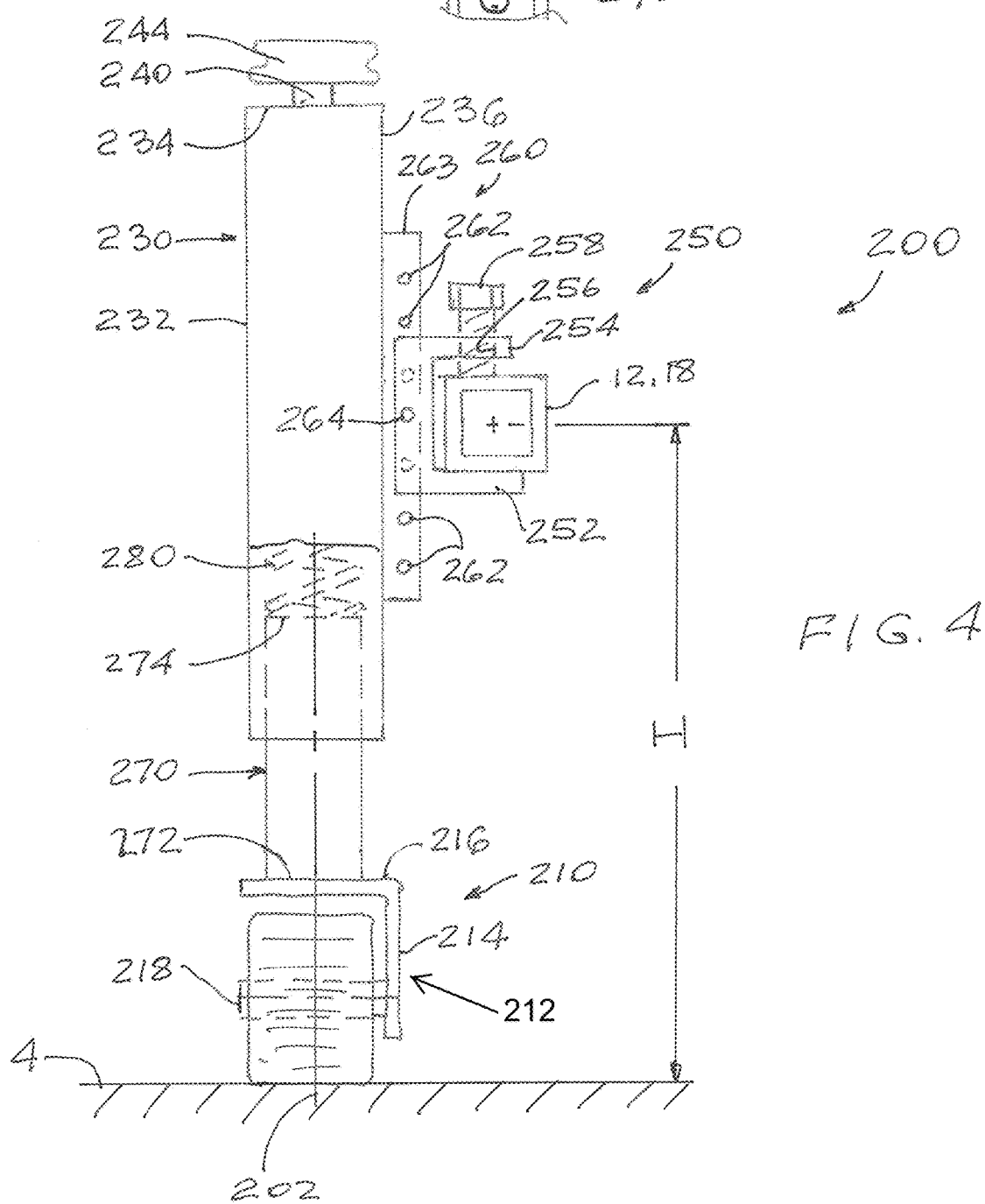

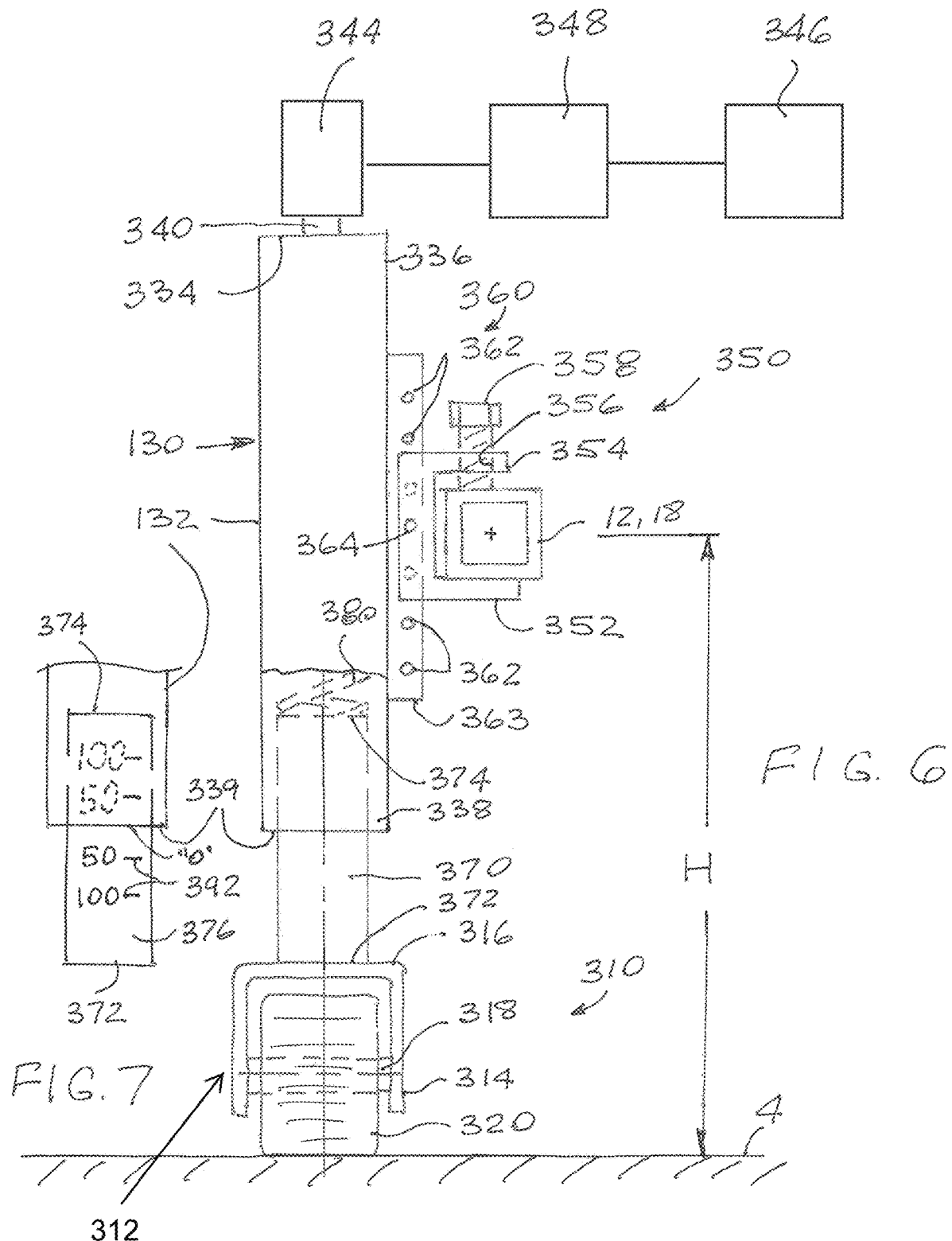

TRAILER TOW ASSIST APPARATUS AND METHOD

CROSS-REFERENCE TO RELATED APPLICATIONS

This present non-provisional application is related to and claims benefit of and priority from U.S. Provisional Patent Application Ser. No. 62/573,757 filed on Oct. 18, 2017 and entitled "TOW ASSIST", the entire contents of which are hereby incorporated by reference thereto.

STATEMENT REGARDING FEDERALLY SPONSORED RESEARCH AND DEVELOPMENT

Not Applicable

REFERENCE TO SEQUENCE LISTING, A TABLE, OR A COMPUTER PROGRAM LISTING COMPACT DISC APPENDIX

Not Applicable

BRIEF DESCRIPTION OF THE DRAWINGS

The accompanying drawings are incorporated in and constitute part of the specification and illustrate various embodiments. In the drawings:

FIG. 2 illustrates a front elevation view of one embodiment of a trailer tow assist apparatus;

FIG. 3 illustrates a partial top view of the trailer tow assist apparatus of FIG. 2;

FIG. 4 illustrates a front elevation view of one embodiment of a trailer tow assist apparatus;

FIG. 5 illustrates a partial top view of the trailer tow assist apparatus of FIG. 4;

FIG. 6 illustrates a front elevation view of one embodiment of a trailer tow assist apparatus;

FIG. 7 is a partial side view of the trailer tow assist apparatus of FIG. 6;

DETAILED DESCRIPTION OF EXEMPLARY EMBODIMENTS

Figure 1:
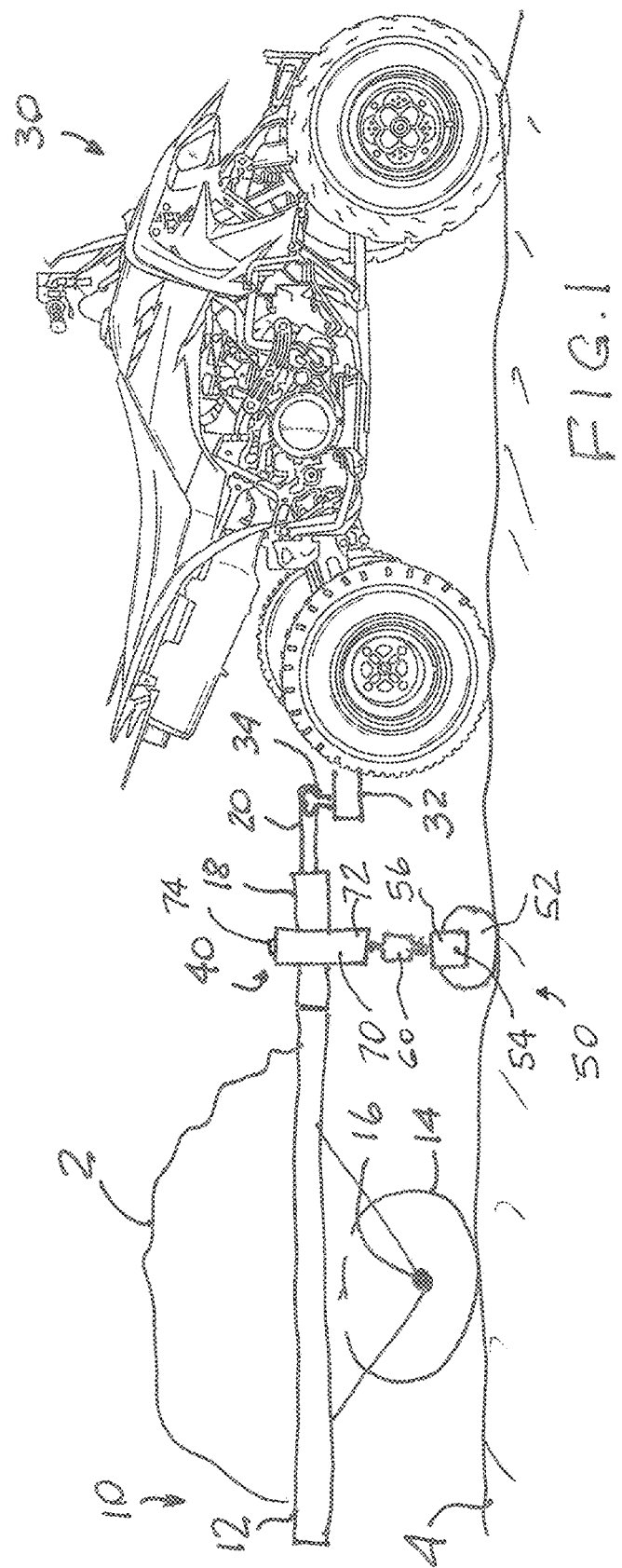
FIG. 1 illustrates an environmental elevation view and an embodiment of a trailer tow assist apparatus.

Prior to proceeding to the more detailed description of the present subject matter, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For purposes of description herein, the directional and/or relationary terms such as "upper," "top," "lower," "bottom," "left," "right," "rear," "back," "front," "apex," "vertical," "horizontal," "lateral," "exterior," "interior," and derivatives thereof are relative to each other and are dependent on the specific orientation of an applicable element or article, and are used accordingly to aid in the description of the various embodiments and are not necessarily intended to be construed as limiting.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The term "or" when used in this specification and the appended claims is not meant to be exclusive; rather the term is inclusive, meaning either or both.

The term "couple" or "coupled" when used in this specification and appended claims refers to an indirect or direct physical connection between the identified elements, components, or objects. Often the manner of the coupling will be related specifically to the manner in which the two coupled elements interact.

The term "directly coupled" or "coupled directly," when used in this specification and appended claims, refers to a physical connection between identified elements, components, or objects, in which no other element, component, or object resides between those identified as being directly coupled.

The term "operatively coupled," when used in this specification and appended claims, refers to a physical connection between identified elements, components, or objects, wherein operation of one of the identified elements, components, or objects, results in operation of another of the identified elements, components, or objects.

The terms "removable", "removably coupled", "removably disposed," "readily removable", "readily detachable", "detachably coupled", "separable," "separably coupled," "releaseably attached", "detachably attached" and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

The term "substantially horizontally" when used herein as referring to elements or features of the disclosed subject matter should be understood to mean that such elements or features are positioned with respect to a vertical line extending there above at an angle of 90°, except for manufacturing tolerances. The angle can be in the range of from about 89° to about 91°, in the range of from about 88° to about 92°, in the range of from about 87° to about 93°, or in the range of from about 85° to about 95°. In other words, the term "substantially horizontally" should be also understood to mean that, if deviating from absolutely horizontal, the disclosed subject matter is operable for its intended purpose.

The term "generally horizontal(ly)" or "generally vertical(ly)" should be also understood to mean respectively horizontally or vertically disposed element or surface but the term does not exclude the possibility of orienting such feature or surface at a small angle relative to respectively absolute horizontal or vertical plane.

The terms and words used in the following description and claims are not limited to the bibliographical meanings, but, are merely used to enable a clear and consistent understanding of the exemplary embodiments. Accordingly, it should be apparent to those skilled in the art that the following description of exemplary embodiments are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide apparatus(es) and method(s) directed to towing a trailer.

In particular embodiments, the trailer tow assist apparatus at least significantly reduces if not completely eliminates, during towing, undesirable torque on a ball and socket hitch assembly due to load on the trailer.

In particular embodiments, the trailer tow assist apparatus at least significantly reduces if not completely eliminates, during towing, undesirable torque on a ball and socket hitch assembly due to uneven terrain.

Generally, off-road vehicles, such as all-terrain vehicles (ATV), utility task vehicles (UTV), recreational off-highway vehicles (ROV), or multipurpose off-highway utility vehicles (MOHUV) are employed to tow a trailer with a load over an uneven terrain. The trailer is conventionally coupled to the vehicle with a ball and socket hitch assembly. When the load is not evenly distributed on a trailer the front end of the off-road vehicle may rise above the terrain during initial movement start due to a greater than desirable torque at the ball and socket hitch assembly. Furthermore, trailers are generally designed to support the load at a location neat the hitch end of the trailer frame, which could be a tow bar. Thus, even when the load is properly disposed on the trailer, the load weight again applies a force to the hitch end of the trailer frame in a downward direction. This force is then transferred onto the ball and socket hitch assembly and is present during towing of the trailer. Furthermore, uneven terrain causes additional undesirable torque onto a ball and socket hitch connection during trailer towing.

Now in a reference to FIG. 1, an exemplary trailer 10, that can be carried by a vehicle 30, comprises a frame 12 supported by a pair of wheels 14 that are operatively connected by an axle 16 and a tow bar 18 extending from a front end of the frame 12. The tow bar 18 conventionally terminates with a hitch socket 20 that defines a hitch end of the trailer 10 and that operatively mates with a ball 34 of a hitch device 32 coupled to the vehicle 30. The tow bar 18 with or without the adjacent portion of the frame 12 can be referred to as a hitch portion of the trailer 10.

In an embodiment, the vehicle 30 can be an off-road vehicle, for an example such as all-terrain vehicle (ATV) also known as a quad, quad bike, three-wheeler, four-wheeler or quadricycle as defined by the American National Standards Institute (ANSI); a Utility Task Vehicle or Utility Terrain Vehicle (UTV) and the like vehicles.

In an embodiment, the vehicle 30 can be a conventional over the road vehicle, for example, such as a sedan, a minivan, a sport utility vehicle (SUV), a small truck and the like vehicles.

The trailer 10 can be configured to carry a wide variety of loads 2. In an example, the trailer 10 can be configured to carry a boat. In an example, the trailer 10 can be configured to carry the ATV or UTV. In an example, the trailer 10 can be configured to carry dirt, bales of hay, household goods, sport or recreational articles, etc. In all examples, the trailer 10 shares a common feature that the trailer 10, when stationary, is configured to be supported at a location adjacent the front end 13 of the frame 12 or at the tow bar 18 for safety purposes.

FIG. 1 also illustrates an embodiment of a trailer tow assist apparatus 40 that assists in towing the trailer 10, particularly when the trailer 10 is carrying the load 2 thereon. The trailer tow assist apparatus 40 comprises a wheel assembly 50 that can have one or more wheels 52. The wheel or wheels 52 can be also referred to as a support wheel or wheels. A single wheel 52 may be mounted for a rotation on an axle 54 supported within a wheel mounting member 56. The wheel mounting member 56 may be also referred to as a wheel mounting bracket. The axle 54 does not have to be continuous and can be provided by a pair of portions, each secured to a respective leg of the wheel mounting member 56. The pair of portions may be also provided as shafts extending from surfaces of the wheel 52. A pair of wheels 52 can be also mounted for a rotation on a single axle, for example such as the axle 54. The pair of wheels may be spaced apart from each other on the axle 54. The wheel mounting member 56 may be also provided as a plate shaped member or a tubular-shaped member, particularly when used with a single wheel 52.

The wheel 52 is of a type that can reliably accommodate even an uneven terrain 4 without an unplanned failure during a continuous use. In an example, the wheel 52 can be a hollow rubber tire. In an example, the wheel 52 can be manufactured from or comprise a solid rubber or polymer material. In other words, the wheel 52 is configured to withstand effects of moving the trailer 10 with the load 2 over an uneven or even terrain 4. The even terrain 4 can be a conventional road surface, paved or concrete. The uneven terrain 4 can be a farm field, a meadow or a prairie, a dirt road, a gravel road and the like terrains. The terrain 4 can comprise bumps and/or small hills.

The trailer tow assist apparatus 40 also comprises a resilient member 60 that is disposed between the wheel assembly 50 and the threaded screw and nut drive 70.

The resilient member 60 is disposed generally vertically during use of the trailer tow assist apparatus 40. In an example, the resilient member 60 can comprise a shock absorber. In an example, the resilient member 60 can comprise a cylinder. In an example, the resilient member 60 can comprise a spring-based assembly. The spring can be a coiled spring, an inflatable rubber spring or a solid elastomer. In operation, the resilient member 60 cycles between compressed and relaxed states. In the relaxed state, the resilient member 60 may be partially compressed.

The threaded screw and nut drive 70 defines an elongated housing 72 and a portion of a screw 74 extending outwardly from one end of the housing 72.

Now in a reference to FIGS. 2-3, therein is illustrated an embodiment of a trailer tow assist apparatus 100 for a trailer with a frame 12 and a hitch socket defining a hitch end of the trailer. The trailer tow assist apparatus 100 comprises a wheel assembly 110 with a wheel mounting member 112 and with a wheel axle 118. A wheel 120 is mounted for a rotation on the wheel axle 118, the wheel 120 engages a ground surface or terrain 4 during use of the trailer tow assist apparatus 100. The wheel 120 is of a type that can reliably accommodate even an uneven terrain 4 without an unplanned failure during a continuous use. In an example, the wheel 120 can be a hollow rubber tire. In an example, the wheel 120 can be manufactured from or comprise a solid rubber or polymer material. In other words, the wheel 120 is configured to withstand effects of moving the trailer 10 with the load 2 over an uneven or even terrain 4. The even terrain 4 can be a conventional road surface, paved or concrete. The uneven terrain 4 can be a farm field, a meadow or a prairie, a dirt road, a gravel road and the like terrains. The terrain 4 can comprise bumps and/or small hills. The wheel mounting member 112 is being illustrated as having a U-shaped configuration with vertical legs 114 and a generally horizontal portion 116. A threaded screw and nut drive 130 is also provided and defines an elongated housing 132 and a portion of a screw 140 extending outwardly from one end 134 of the housing 132. An actuation member 144 is coupled to the portion of the screw 140 extending outwardly from the one end 134 of the housing 132 and configured to rotate the threaded screw about a vertical axis 102 of the trailer tow assist apparatus 100. The actuation member 144 is illustrated as being a manually operable knob that would be grasped by user's hand. A support mounting member 150 is configured to couple the housing 132 to a portion of the frame 12 or to the tow bar 18. The support mounting member 150 defines a lower flange 152 and an upper flange 154 spaced apart from each other to receive the portion of the frame 12 or the tow bar 18. The support mounting member 150 is so configured that the lower flange 152 abuts and contacts an exterior surface of the frame 12 or the tow bar 18. A gap is allowed between the upper flange 154 and the upper surface of the frame portion or tow bar 18. The support mounting member 150 of FIGS. 2-3 is also configured to detachably attach the threaded screw and nut drive 130, by being adapted with a fastener 158 engaging a threaded aperture 156 in the upper flange 154. It would be understood that such configuration essentially clamps the support mounting member 150 on the portion of the frame 12 or to the tow bar 18. In this configuration, a contact between the lower flange 154 and the portion of the frame 12 or the tow bar 18 is maintained during use and allows the support mounting member 150 to absorbs shocks and upward forces during use of the trailer tow assist apparatus 100. A height adjusting assembly 160 is also provided and comprises first apertures 162 exposed from an exterior surface 136 of the housing 132. The first apertures 162 can be formed through a thickness of the flange 163 on the surface 136 of the housing 132. The first apertures 162 are being spaced at a distance from each other in the vertical direction during use of the trailer tow assist apparatus 100. At least one second aperture 164 is provided in the support mounting member 150. The at least one aperture 164 aligns with one first aperture 162 from the first apertures 162 during use of the trailer tow assist apparatus 100. A pin 168 is passed, during use of the trailer tow assist apparatus 100, through the at least one second aperture 164 aligned with the one first aperture 162 to establish a distance "H" between the hitch device 32 and the terrain 4. Such distance "H" is generally equal to the height of the hitch device 32 on the vehicle 30. The spacing between first apertures 162 are selected based on distances "H" for various vehicles 30. A rigid member 170 comprises a first end 172 and a second end 174 spaced from the first end 172 in a generally vertical direction during the use of the trailer tow assist apparatus 100. There is a connection between one of the first end 172 and the second end 174 of the rigid member 170 and the portion 116 of wheel mounting member 112 so that the rigid member 170 upstands on the wheel mounting member 112 during the use of the trailer tow assist apparatus 100 and where another one of the first end 172 and the second end 174 of the rigid member 170 is disposed within the housing 132. Such connection is a rigid connection, for example by welding or fastening method. The connection can be a direct connection or can comprise additional members or features (not shown) for a fastening method. A resilient member 180 is disposed, either fully or partially, within the housing 132 in a direct or indirect contact with the end 174 of the rigid member 170. The resilient member 180 is disposed generally vertically during use of the trailer tow assist apparatus 100. In an example, the resilient member 180 can comprise a shock absorber. In an example, the resilient member 180 can comprise a cylinder. In an example, the resilient member 180 can comprise a spring. The spring can be a coiled spring, an inflatable rubber spring or a solid elastomer. In operation, the resilient member 180 cycles between compressed and relaxed states. In the relaxed or extended state, the resilient member 180 may be partially compressed. A scale 190 is disposed on a surface 176 of the rigid member 170 in an operative alignment with an edge 139 of the longitudinally opposite end 138 of the housing 132. The scale 190 is configured to define effect of a load 2 on the frame 12 onto the trailer tow assist apparatus 100 causing a compression of the resilient member 180. The scale 190 is being illustrated as comprising spaced apart line markings 192 and numerals 194. Numerals 194 are being illustrated as defining a weight of the load 2, but could be also selected to define a relative degree of the compression of the resilient member 180 or compression distance. Units of measure could be in either or both of English or Metric unit measurement systems. The location of line markings 192 is selected to so that the lower edge 139 is at the upper line marking, shown as zero in FIG. 2, when the trailer tow assist apparatus 100 is attached to the portion of the frame 12 and the trailer 10 is hitched to the vehicle 30. The rigid member 170 is coupled to the housing 132 so as to prevent unintended separation therefrom. In other words, the threaded screw and nut drive 130, the rigid member 170, the resilient member 180, the scale 190 and the wheel assembly 110 are provided as a unitary construction that is coupled, during use, first to the support mounting member 150 and then to the frame 12 or to the tow bar 18. Or the support mounting member 150 can be coupled to the frame 12 or to the tow bar 18 first.

To prepare the trailer tow assist apparatus 100 for use, the trailer tow assist apparatus 100 is attached to the frame 12 or to the tow bar 18 behind the socket 20. The height is adjusted through apertures 162 and 164 so that the wheel 120 engages the ground surface 4. The weight of the trailer 10 is allowed to be absorbed by the trailer tow assist apparatus 100. On trailer 10 equipped with a permanent jack (not shown), this jack is raised so its wheel does not touch the ground surface 4. When the trailer weight is on the trailer tow assist apparatus 100, the lower edge 139 will move downwardly due to the compression of the resilient member 180 and rest adjacent a specific line marking 192 defining the trailer weight. The actuation member 144 is then manually rotated to operate the threaded screw and nut drive 130 in order to relax the resilient member 180 until the lower edge 139 reaches the initial line marking 192, that can be a "zero" or any other value. In this condition the trailer tow assist apparatus 100 is ready for use, where it will support the trailer weight during towing, although it is not necessary that the trailer tow assist apparatus 100 supports all of trailer weight. Furthermore, the resilient member 180 will compress and expand on uneven terrain 4.

It would be further understood that the trailer tow assist apparatus 100 can be provided as an after-market component to be installed on trailers 10 already in use.

FIGS. 2-3 also illustrate an embodiment of a trailer frame comprising the trailer tow assist apparatus 100. FIGS. 2-3 additionally illustrate an embodiment of a trailer comprising the frame 12, wheels 14, the tow bar 18, and trailer tow assist apparatus 100.

FIGS. 2-3 additionally illustrate an embodiment of detachably attaching at least a threaded screw and nut drive to the trailer frame or the tow bar.

Now in a reference to FIGS. 4-5, therein is illustrated an embodiment of a trailer tow assist apparatus 200 for a trailer with a frame 12 and a hitch socket defining a hitch end of the trailer. The trailer tow assist apparatus 200 comprises a wheel assembly 210 with a wheel mounting member 212 and with a wheel axle 218. A wheel 220 is mounted for a rotation on the wheel axle 218, the wheel 220 engages a ground surface or terrain 4 during use of the trailer tow assist apparatus 200. The wheel 220 is of a type that can reliably accommodate even an uneven terrain 4 without an unplanned failure during a continuous use. In an example, the wheel 220 can be a hollow rubber tire. In an example, the wheel 220 can be manufactured from or comprise a solid rubber or polymer material. In other words, the wheel 220 is configured to withstand effects of moving the trailer 10 with the load 2 over an uneven or even terrain 4. The even terrain 4 can be a conventional road surface, paved or concrete. The uneven terrain 4 can be a farm field, a meadow or a prairie, a dirt road, a gravel road and the like terrains. The terrain 4 can comprise bumps and/or small hills. The wheel mounting member 212 is being illustrated as having an L-shaped configuration with a vertical leg 214 and a generally horizontal portion 216. A threaded screw and nut drive 230 is also provided and defines an elongated housing 232 and a portion of a screw 240 extending outwardly from one end 234 of the housing 232. An actuation member 244 is coupled to the portion of the screw 240 extending outwardly from the one end 234 of the housing 232 and configured to rotate the threaded screw about a vertical axis 202 of the trailer tow assist apparatus 200. The actuation member 244 is illustrated as being a manually operable knob that would be grasped by user's hand. A support mounting member 250 is configured to couple the housing 232 to a portion of the frame 12 or to the tow bar 18. The support mounting member 250 defines a lower flange 252 and an upper flange 254 spaced apart from each other to receive the portion of the frame or the tow bar 18. The support mounting member 250 is so configured that the lower flange 252 abuts and contacts an exterior surface of the frame 12 or the tow bar 18. A gap is allowed between the upper flange 254 and the upper surface of the frame portion or tow bar 18. The support mounting member 250 of FIGS. 4-5 is also configured to detachably attach the threaded screw and nut drive 230, by being adapted with a fastener 258 engaging a threaded aperture 256 in the upper flange 254. It would be understood that such configuration essentially clamps the support mounting member 250 on the portion of the frame 12 or to the tow bar 18. In this configuration, a contact between the upper flange 254 and the portion of the frame 12 or the tow bar 18 is maintained during use and allows the support mounting member 250 to absorbs shocks and upward forces during use of the trailer tow assist apparatus 200. A height adjusting assembly 260 is also provided and comprises first apertures 262 exposed from an exterior surface 236 of the housing 232. The first apertures 262 can be formed through a thickness of the flange 263 on the surface 236 of the housing 232. The first apertures 262 are being spaced at a distance from each other in the vertical direction during use of the trailer tow assist apparatus 200. At least one second aperture 264 is provided in the support mounting member 250. The at least one aperture 264 aligns with one first aperture 262 from the first apertures 262 during use of the trailer tow assist apparatus 200. A pin 268 is passed, during use of the trailer tow assist apparatus 200, through the at least one second aperture 264 aligned with the one first aperture 262 to establish a distance "H" between the hitch device 32 and the terrain 4. Such distance "H" is generally equal to the height of the hitch device 32 on the vehicle 30. The spacing between first apertures 262 are selected based on distances "H" for various vehicles 30. A rigid member 270 comprises a first end 272 and a second end 274 spaced from the first end 272 in a generally vertical direction during the use of the trailer tow assist apparatus 200. There is a connection between one of the first end 272 and the second end 274 of the rigid member 270 and the portion 216 of wheel mounting member 212 so that the rigid member 270 upstands on the wheel mounting member 212 during the use of the trailer tow assist apparatus 200 and where another one of the first end 272 and the second end 274 of the rigid member 270 is disposed within the housing 232. Such connection is a rigid connection, for example by welding or fastening method. The connection can be a direct connection or can comprise additional members or features (not shown) for a fastening method. A resilient member 280 is disposed, either fully or partially, within the housing 232 in a direct or indirect contact with the end 274 of the rigid member 270. The resilient member 280 is disposed generally vertically during use of the trailer tow assist apparatus 200. In an example, the resilient member 280 can comprise a shock absorber. In an example, the resilient member 280 can comprise a cylinder. In an example, the resilient member 280 can comprise a spring. The spring can be a coiled spring, an inflatable rubber spring or a solid elastomer. In operation, the resilient member 280 cycles between compressed and relaxed states. In the relaxed or extended state, the resilient member 280 may be partially compressed. A level member 290 is mounted on a tow bar 18 or on a portion of the frame 12. The level member 290 is configured to define a generally leveled or a generally not-leveled condition of the frame 12 in a relationship to the ground surface 4 when the frame 12 carries the load 2 thereon and is supported on the wheel 220. The level member 290 can comprise a bulb vial. The level member 290 can comprise an electric eye sensing a target on the vehicle. The level member 290 can comprise an electronic level. The electronic level may be a Zircon® ULTRA-LEVEL 6™ available from Zircon Corporation, Campbell, Calif. Model No. 50524. This level utilizes electrical capacitance to measure angles and is described in detail in U.S. Pat. No. 5,083,383, assigned to Zircon. The disclosure of U.S. Pat. No. 5,083,383 is incorporated in its entirety herein by reference. The rigid member 270 is coupled to the housing 232 so as to prevent unintended separation therefrom. In other words, the threaded screw and nut drive 230, the rigid member 270, the resilient member 280, and the wheel assembly 210 are provided as a unitary construction that is coupled, during use, first to the support mounting member 250 and then to the frame 12 or to the tow bar 18. Or, the support mounting member 250 can be coupled to the frame 12 or to the tow bar 18 first.

To prepare the trailer tow assist apparatus 200 for use, the trailer tow assist apparatus 200 is attached to the frame 12 or to the tow bar 18 behind the socket 20. The height is adjusted through apertures 262 and 264 so that the wheel 220 engages the ground surface 4. The weight of the trailer 10 is allowed to be absorbed by the trailer tow assist apparatus 200. On trailer 10 equipped with a permanent jack (not shown), this jack is raised so its wheel does not touch the ground surface 4. When the trailer weight is on the trailer tow assist apparatus 200, the lower edge 239 will move downwardly due to the compression of the resilient member 280. The actuation member 244 is then manually rotated to operate the threaded screw and nut drive 230 in order to relax the resilient member 280 until the level member 290 defines a generally leveled condition. In other words, the trailer 10 does not has to be perfectly leveled. In this condition the trailer tow assist apparatus 200 is ready for use, where it will support the trailer weight during towing, although it is not necessary that the trailer tow assist apparatus 200 supports all of trailer weight. Furthermore, the resilient member 280 will compress and expand on uneven terrain 4. It would be further understood that the trailer tow assist apparatus 200 can be provided as an after-market component to be installed on trailers 10 already in use.

FIGS. 4-5 also illustrate an embodiment of a trailer frame comprising the trailer tow assist apparatus 200. FIGS. 4-5 additionally illustrate an embodiment of a trailer comprising the frame 12, wheels 14, the tow bar 18, and trailer tow assist apparatus 200.

Now in a reference to FIGS. 6-7, therein is illustrated an embodiment of a trailer tow assist apparatus 300 for a trailer with a frame 12 and a hitch socket defining a hitch end of the trailer. The trailer tow assist apparatus 300 comprises a wheel assembly 310 with a wheel mounting member 312 and with a wheel axle 318. A wheel 320 is mounted for a rotation on the wheel axle 318, the wheel 320 engages a ground surface or terrain 4 during use of the trailer tow assist apparatus 300. The wheel 320 is of a type that can reliably accommodate even an uneven terrain 4 without an unplanned failure during a continuous use. In an example, the wheel 320 can be a hollow rubber tire. In an example, the wheel 320 can be manufactured from or comprise a solid rubber or polymer material. In other words, the wheel 320 is configured to withstand effects of moving the trailer 10 with the load 2 over an uneven or even terrain 4. The even terrain 4 can be a conventional road surface, paved or concrete. The uneven terrain 4 can be a farm field, a meadow or a prairie, a dirt road, a gravel road and the like terrains. The terrain 4 can comprise bumps and/or small hills. The wheel mounting member 312 is being illustrated as having a U-shaped configuration with vertical legs 314 and a generally horizontal portion 316. A threaded screw and nut drive 330 is also provided and defines an elongated housing 332 and a portion of a screw 340 extending outwardly from one end 334 of the housing 332. An actuation member 344 is coupled to the portion of the screw 340 extending outwardly from the one end 334 of the housing 332 and configured to rotate the threaded screw about a vertical axis 302 of the trailer tow assist apparatus 300. The actuation member 344 is diagrammatically illustrated as being an electric motor coupled to a source 346 of electric power. Such source 346 can be a battery mounted on the trailer 10 or a connection to an electrical system of the vehicle 30. A switch 348 can be also provided to selectively operate the electric motor 344. A support mounting member 350 is configured to couple the housing 332 to a portion of the frame 12 or to the tow bar 18. The support mounting member 350 defines a lower flange 352 and an upper flange 354 spaced apart from each other to receive the portion of the frame 12 or the tow bar 18. The support mounting member 350 is so configured that the lower flange 352 abuts and contacts an exterior surface of the frame 12 or the tow bar 18. A gap is allowed between the upper flange 354 and the upper surface of the frame portion or tow bar 18. The support mounting member 350 of FIG. 6 is also configured to detachably attach the threaded screw and nut drive 330, by being adapted with a fastener 358 engaging a threaded aperture 356 in the upper flange 354. It would be understood that such configuration essentially clamps the support mounting member 350 on the portion of the frame 12 or to the tow bar 18. In this configuration, a contact between the lower flange 354 and the portion of the frame 12 or the tow bar 18 is maintained during use and allows the support mounting member 350 to absorb shocks and upward forces during use of the trailer tow assist apparatus 300. A height adjusting assembly 360 is also provided and comprises first apertures 362 exposed from an exterior surface 336 of the housing 332. The first apertures 362 can be formed through a thickness of the flange 363 on the surface 336 of the housing 332. The first apertures 362 are being spaced at a distance from each other in the vertical direction during use of the trailer tow assist apparatus 300. At least one second aperture 364 is provided in the support mounting member 350. The at least one aperture 364 aligns with one first aperture 362 from the first apertures 362 during use of the trailer tow assist apparatus 300. A pin 368 is passed, during use of the trailer tow assist apparatus 300, through the at least one second aperture 364 aligned with the one first aperture 362 to establish a distance "H" between the hitch device 32 and the terrain 4. Such distance "H" is generally equal to the height of the hitch device 32 on the vehicle 30. The spacing between first apertures 362 are selected based on distances "H" for various vehicles 30. A rigid member 370 comprises a first end 372 and a second end 374 spaced from the first end 372 in a generally vertical direction during the use of the trailer tow assist apparatus 300. There is a connection between one of the first end 372 and the second end 374 of the rigid member 370 and the portion 316 of wheel mounting member 312 so that the rigid member 370 upstands on the wheel mounting member 312 during the use of the trailer tow assist apparatus 300 and where another one of the first end 372 and the second end 374 of the rigid member 370 is disposed within the housing 332. Such connection is a rigid connection, for example by welding or fastening method. The connection can be a direct connection or can comprise additional members or features (not shown) for a fastening method. A resilient member 380 is disposed, either fully or partially, within the housing 332 in a direct or indirect contact with the second end 374 of the rigid member 370. The resilient member 380 is disposed generally vertically during use of the trailer tow assist apparatus 300. In an example, the resilient member 380 can comprise a shock absorber. In an example, the resilient member 380 can comprise a cylinder. In an example, the resilient member 380 can comprise a spring. The spring can be a coiled spring, an inflatable rubber spring or a solid elastomer. In operation, the resilient member 380 cycles between compressed and relaxed states. In the relaxed or extended state, the resilient member 380 may be partially compressed. A scale 390 is disposed on a surface 376 of the rigid member 370 in an operative alignment with an edge 339 of the longitudinally opposite end 338 of the housing 332. The scale 390 is configured to define effect of a load 2 on the frame 12 onto the trailer tow assist apparatus 300 causing a compression of the resilient member 380. The scale 390 is being illustrated as comprising spaced apart line markings 392 and numerals 394. Numerals 394 are being illustrated as defining a weight of the load 2, but could be also selected to define a relative degree of the compression of the resilient member 380 or compression distance. Units of measure could be in either or both of English or Metric unit measurement systems. The location of line markings 392 is selected to so that the lower edge 339 is at the middle (initial) line marking, shown as zero in FIG. 7, when the trailer tow assist apparatus 300 is attached to the portion of the frame 12 and the trailer 10 is hitched to the vehicle 30. The rigid member 370 is coupled to the housing 332 so as to prevent unintended separation therefrom. In other words, the threaded screw and nut drive 330, the rigid member 370, the resilient member 380, the scale 390 and the wheel assembly 310 are provided as a unitary construction that is coupled, during use, first to the support mounting member 350 and then to the frame 12 or to the tow bar 18. Or the support mounting member 350 can be coupled to the frame 12 or to the tow bar 18 first.

To prepare the trailer tow assist apparatus 300 for use, the trailer tow assist apparatus 300 is attached to the frame 12 or to the tow bar 18 behind the socket 20. The height is adjusted through apertures 362 and 364 so that the wheel 320 engages the ground surface 4. The weight of the trailer 10 is allowed to be absorbed by the trailer tow assist apparatus 300. On trailer 10 equipped with a permanent jack (not shown), this jack is raised so its wheel does not touch the ground surface 4. When the trailer weight is on the trailer tow assist apparatus 300, the lower edge 339 will move downwardly due to the compression of the resilient member 380 and rest adjacent a specific line marking 392 defining the trailer weight, for example such as line marking adjacent numeral 50. The permanent jack (not shown) is then used to support the trailer weight. With the trailer tow assist apparatus 300 being moved in a position where the wheel 320 does not touch the ground surface 4 anymore. The actuation member 344 is then powered to rotate the threaded screw and nut drive 330 in order to relax the resilient member 380 until the lower edge 339 reaches the upper line marking 392 adjacent the upper numeral 50, thus essentially "counterbalancing" the compression of the resilient member 380. The trailer tow assist apparatus 300 is then positioned so that the wheel 220 touches the ground surface 4 and the trailer weight is again let be supported by the trailer tow assist apparatus 300. In this position the lower edge 339 will be positioned at or adjacent the zero line marking In this condition the trailer tow assist apparatus 300 is ready for use, where it will support the trailer weight during towing, although it is not necessary that the trailer tow assist apparatus 300 supports all of trailer weight. Furthermore, the resilient member 380 will compress and expand on uneven terrain 4.

It would be further understood that the trailer tow assist apparatus 300 can be provided as an after-market component to be installed on trailers 10 already in use.

It is to be understood that the scale 390 of FIGS. 6-7 can be used within the trailer tow assist apparatus 100 of FIGS. 2-3. In other words, the lower edge of the housing can be initially positioned at or adjacent the middle line markings from the series of line markings or at a terminal line marking.

It is to be also understood that the powered actuation member 344 can replace the manual actuation member 144 of FIGS. 2-3 or the manual actuation member 244 of FIGS. 4-5. Likewise, the manually operated actuation member 144 of FIGS. 2-3 or the manual actuation member 244 of FIGS. 4-5 can replace the powered actuation member 344 in FIG. 6.

FIGS. 6-7 also illustrate an embodiment of a trailer frame comprising the trailer tow assist apparatus 300. FIGS. 6-7 additionally illustrate an embodiment of a trailer comprising the frame 12, wheels 14, the tow bar 18, and trailer tow assist apparatus 300.

Figures 8, 9:
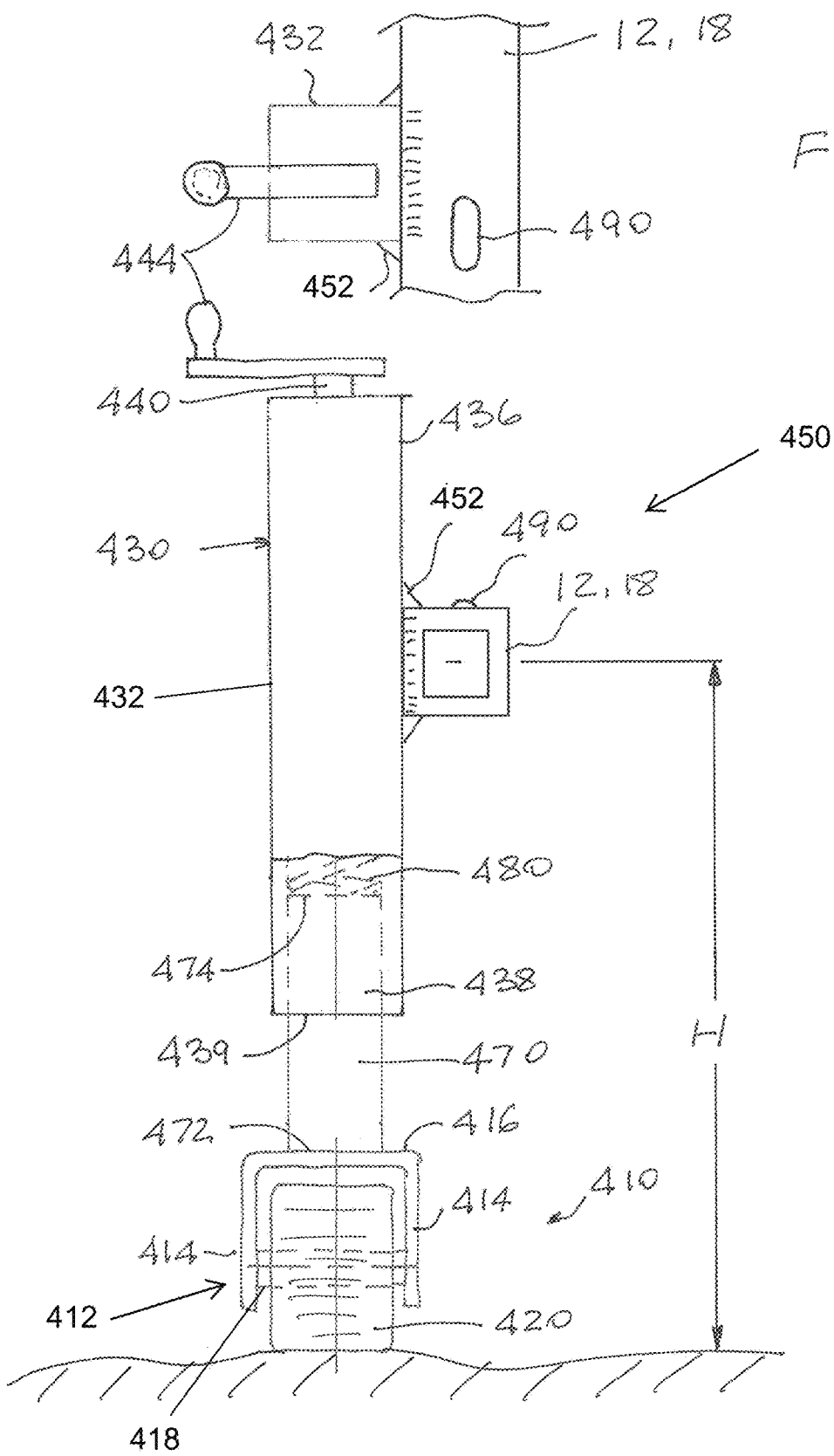
FIG. 8 illustrates a front elevation view of one embodiment of a trailer tow assist apparatus.
FIG. 9 illustrates a partial top view of the trailer tow assist apparatus of FIG. 8.

Now in a reference to FIGS. 8-9, therein is illustrated an embodiment of a trailer tow assist apparatus 400 for a trailer with a frame 12 and a hitch socket defining a hitch end of the trailer. The trailer tow assist apparatus 400 comprises a wheel assembly 410 with a wheel mounting member 412 and with a wheel axle 418. A wheel 420 is mounted for a rotation on the wheel axle 418, the wheel 420 engages a ground surface or terrain 4 during use of the trailer tow assist apparatus 400. The wheel 420 is of a type that can reliably accommodate even an uneven terrain 4 without an unplanned failure during a continuous use. In an example, the wheel 420 can be a hollow rubber tire. In an example, the wheel 420 can be manufactured from or comprise a solid rubber or polymer material. In other words, the wheel 420 is configured to withstand effects of moving the trailer 10 with the load 2 over an uneven or even terrain 4. The even terrain 4 can be a conventional road surface, paved or concrete. The uneven terrain 4 can be a farm field, a meadow or a prairie, a dirt road, a gravel road and the like terrains. The terrain 4 can comprise bumps and/or small hills. The wheel mounting member 442 is being illustrated as having a U-shaped configuration with vertical legs 414 and a generally horizontal portion 416. A threaded screw and nut drive 430 is also provided and defines an elongated housing 432 and a portion of a screw 440 extending outwardly from one end 434 of the housing 432. An actuation member 444 is coupled to the portion of the screw 440 extending outwardly from the one end 434 of the housing 432 and configured to rotate the threaded screw about a vertical axis 402 of the trailer tow assist apparatus 400. The actuation member 444 is illustrated as being a manually operable crank handle that would be grasped by user's hand. The housing 432 is illustrated as being rigidly and permanently secured to the frame 12 or tow bar 18 with one or more welds 452. Such configuration can be used on originally manufactured trailers 10, particularly configured for a specific type of vehicle 30, where there is no need to adjust the distance H. Alternatively, the height adjustment assembly 160 of FIGS. 2-3 can be employed in the trailer tow assist apparatus 400 but with a permanent attachment of the support mounting member 150. A rigid member 470 comprises a first end 472 and a second end 474 spaced from the first end 472 in a generally vertical direction during the use of the trailer tow assist apparatus 400. There is a connection between one of the first end 472 and the second end 474 of the rigid member 470 and the portion 416 of wheel mounting member 412 so that the rigid member 470 upstands on the wheel mounting member 412 during the use of the trailer tow assist apparatus 400 and where another one of the first end 472 and the second end 474 of the rigid member 470 is disposed within the housing 432. Such connection is a rigid connection, for example by welding or fastening method. The connection can be a direct connection or can comprise additional members or features (not shown) for a fastening method. A resilient member 480 is disposed, either fully or partially, within the housing 432 in a direct or indirect contact with the end 474 of the rigid member 470. The resilient member 480 is disposed generally vertically during use of the trailer tow assist apparatus 400. In an example, the resilient member 480 can comprise a shock absorber. In an example, the resilient member 480 can comprise a cylinder. In an example, the resilient member 480 can comprise a spring. The spring can be a coiled spring, an inflatable rubber spring or a solid elastomer. In operation, the resilient member 480 cycles between compressed and relaxed states. In the relaxed or extended state, the resilient member 480 may be partially compressed. A level member 490 is mounted on a tow bar 18 or on a portion of the frame 12. The level member 490 is configured to define a generally leveled or a generally not-leveled condition of the frame 12 in a relationship to the ground surface 4 when the frame 12 carries the load 2 thereon and is supported on the wheel 420. The level member 490 can comprise a bulb vial. The level member 490 can comprise an electric eye sensing a target on the vehicle. The level member 490 can comprise an electronic level. The electronic level may be a Zircon® ULTRA-LEVEL 6™ available from Zircon Corporation, Campbell, Calif. Model No. 50524. This level utilizes electrical capacitance to measure angles and is described in detail in U.S. Pat. No. 5,083,383, assigned to Zircon. The disclosure of U.S. Pat. No. 5,083,383 is incorporated in its entirety herein reference. The rigid member 470 is coupled to the housing 432 so as to prevent unintended separation therefrom. In other words, the threaded screw and nut drive 430, the rigid member 470, the resilient member 480, the level member 490 and the wheel assembly 410 are provided as a unitary construction that is coupled, during use, first to the support mounting member 450 and then to the frame 12 or to the tow bar 18. Or the support mounting member 450 can be coupled to the frame 12 or to the tow bar 18 first.

To prepare the trailer tow assist apparatus 400 for use, the trailer tow assist apparatus 400 is attached to the frame 12 or to the tow bar 18 behind the socket 20. When the trailer weight is on the trailer tow assist apparatus 400, the lower edge 439 will move downwardly due to the compression of the resilient member 480. The actuation member 444 is then manually rotated to operate the threaded screw and nut drive 430 in order to relax the resilient member 280 until the level member 490 defines a generally leveled condition. In other words, the trailer 10 does not has to be perfectly leveled. In this condition the trailer tow assist apparatus 400 is ready for use, where it will support the trailer weight during towing, although it is not necessary that the trailer tow assist apparatus 400 supports all of trailer weight. The trailer frame 12 or the tow bar 18 can be additionally supported during leveling to reduce a force required to turn the crank handle 444. Furthermore, the resilient member 280 will compress and expand on uneven terrain 4.

It is to be also understood that the powered actuation member 344 can replace the manual actuation member 444 of FIGS. 8-9. Likewise, the manually operated actuation member 444 of FIGS. 8-9 can replace the powered actuation member 344 in FIG. 6 or the manual actuation members in FIGS. 2-5.

FIGS. 8-9 also illustrate an embodiment of a trailer frame comprising the trailer tow assist apparatus 400. FIGS. 8-9 additionally illustrate an embodiment of a trailer comprising the frame 12, wheels 14, the tow bar 18, and trailer tow assist apparatus 400.

Thus, it would be understood that in any of the above described embodiments, the trailer tow assist apparatus at least reduces if not completely eliminates undesirable forces or weights onto the ball and socket hitch connection between a vehicle and a trailer being towed by the vehicle. Furthermore, the in any of the above described embodiments, the trailer tow assist apparatus absorbs shocks from the uneven terrain during towing process, by at least transferring such shocks onto the trailer frame or the tow bar and away from the ball and socket hitch connection.

In any of the above embodiments, the distance H of the trailer tow assist apparatus can be adjusted prior to connection to the vehicle, for example by knowing the distance of the vehicle hitch from the ground level. Furthermore, if the weight effect of the trailer load is known before hand, for example based on trials or manufacturer specifications, the tension on resilient member can be adjusted before attaching the trailer tow assist apparatus to the trailer frame or tow bar.

In an embodiment, a trailer support for a trailer with a frame, a tow bar extending from the frame and a hitch socket on a terminal end of the tow bar, the trailer support comprises a wheel mounting member with a wheel axle; a wheel mounted for a rotation on the wheel axle; a shock absorber; a swivel connection between the shock absorber and the wheel mounting member; a height adjuster member coupled to the shock absorber; a second connection between the shock absorber and the tow bar; an electric motor coupled to the second connection and operable to change a working length of the height adjusting member so as to adjust a height of the trailer frame in a relationship to the wheel; a battery coupled to the electric motor; and a level member mounted on a tow bar and configured to identify a leveled or not-leveled condition of the frame in a relationship to a ground surface when the trailer frame carries a load and is supported on the wheel. In this embodiment, the wheel mounting member can comprise a U-shaped bracket. In this embodiment, the second connection can comprise a swivel member. In this embodiment, the second connection can comprise a pivot assembly configured to move the wheel between a first position wherein the wheel contacts a ground (terrain) surface and a second position wherein the wheel is disposed at a distance from the ground surface in a contactless arrangement therewith In this embodiment, the wheel is configured to withstand effects of moving the trailer with a load over a terrain.

In an embodiment, a trailer support for a trailer with a frame, a tow bar extending from the frame and a hitch socket on a terminal end of the tow bar, the trailer support comprises a wheel mounting member with a wheel axle; a wheel mounted for a rotation on the wheel axle; a shock absorber; a swivel connection between the shock absorber and the wheel mounting member; a height adjuster member coupled to the shock absorber; a second connection between the shock absorber and the tow bar; a manual crank coupled to the height adjuster and operable to change a working length of the height adjusting member so as to adjust a height of the trailer frame in a relationship to the wheel; and a level member mounted on a tow bar and configured to identify a leveled or not-leveled condition of the frame in a relationship to a ground surface when the trailer frame carries a load and is supported on the wheel. In this embodiment, the wheel mounting member can comprise a U-shaped bracket. In this embodiment, the second connection can comprise a swivel member. In this embodiment, the wheel is configured to withstand effects of moving the trailer with a load over a terrain.

Thus, a method of leveling the above described trailer comprises providing a trailer support of any of the described embodiments, positioning the trailer on a leveled terrain or surface and using the means for adjusting the height of the trailer frame to adjust the height of the trailer frame until the level member indicates a leveled condition.

A method of transporting a load on the above described trailer over a terrain comprises adapting a hitch end of the trailer with a trailer support of any of the described embodiments so that the wheel of the trailer support contacts the terrain; adjusting, on a leveled terrain, a height of the frame with the load disposed thereon, until the level member indicates the leveled condition; connecting, using the hitch, the frame to the vehicle; and moving the load with the vehicle over the terrain.

It has also been found that the above described trailer support can be advantageous for use on campers connectable to the vehicle with the ball and socket hitch assembly.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed it Its.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present subject matter. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the claimed subject matter are approximations, the numerical values set forth in the specific examples are reported as precisely as possible.

Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

Anywhere the term "comprising" is used, embodiments and components "consisting essentially of" and "consisting of" are expressly disclosed and described herein."

Furthermore, the Abstract is not intended to be limiting as to the scope of the claimed subject matter and is for the purpose of quickly determining the nature of the claimed subject matter.

What is claimed is:

1. A trailer tow assist apparatus for a trailer with a frame and a hitch socket defining a hitch end of the trailer, said trailer tow assist apparatus comprising:
   a wheel mounting member with a wheel axle;
   a wheel mounted for a rotation on said wheel axle, said wheel engaging a ground surface during use of said trailer tow assist apparatus;
   a threaded screw and nut drive defining an elongated housing and a portion of a screw extending outwardly from one end of said housing;

an actuation member coupled to said portion of said screw extending outwardly from said one end of said housing and configured to rotate said threaded screw about a vertical axis;

a support mounting member configured to couple said housing to a portion of the frame;

a height adjusting assembly, comprising:
first apertures exposed from an exterior surface of said housing, said first apertures spaced at a distance from each other in a vertical direction during said use of said trailer tow assist apparatus,
at least one second aperture in said support mounting member, said at least one aperture that aligns with one first aperture from said first apertures during said use of said trailer tow assist apparatus, and
a pin passed, during said use of said trailer tow assist apparatus, through said at least one second aperture aligned with said one first aperture;

a rigid member comprising a first end and a second end spaced from said first end in said vertical direction during said use of said trailer tow assist apparatus;

a connection between one of said first end and said second end of said rigid member and said wheel mounting member so that said rigid member upstands on said wheel mounting member during said use of said trailer tow assist apparatus and where another one of said first end and said second end of said rigid member is disposed within said housing;

a resilient member disposed in a contact with said another one of said first end and said second end of said rigid member within said housing; and a scale disposed on a surface of said rigid member in an operative alignment with an edge of a longitudinally opposite end of said housing, said scale configured to define effect of a load on the frame onto said trailer tow assist apparatus, said load causing a compression of said resilient member.

2. The trailer tow assist apparatus of claim 1, wherein said actuation member comprises an electric motor and a source of electric power coupled to said electric motor.

3. The trailer tow assist apparatus of claim 1, wherein said actuation member comprises a manually operable crank or a knob.

4. The trailer tow assist apparatus of claim 1, wherein said wheel mounting member comprises a U-shaped or an L-shaped member.

5. The trailer tow assist apparatus of claim 1, wherein said wheel is configured to withstand effects of towing the trailer with a load over an uneven terrain.

6. The trailer tow assist apparatus of claim 1, wherein said resilient member comprises a spring.

7. The trailer tow assist apparatus of claim 1, wherein said scale comprises line markings and numerals.

8. The trailer tow assist apparatus of claim 1, wherein said scale defines a relative degree of a compression of said resilient member or a compression distance thereof.

9. The trailer tow assist apparatus of claim 1, wherein said scale defines an effect of a load on the frame onto said trailer tow assist apparatus, said load causing a compression of said resilient member.

10. The trailer tow assist apparatus of claim 1, wherein said wheel comprises a pair of wheels.

11. A trailer tow assist apparatus for a trailer with a frame and a hitch socket defining a hitch end of the trailer, said trailer tow assist apparatus comprising:
a wheel mounting member with a wheel axle;
a wheel mounted for a rotation on said wheel axle, said wheel engaging a ground surface during use of said trailer tow assist apparatus;
a threaded screw and nut drive defining an elongated housing and a portion of a screw extending outwardly from one end of said housing;
an actuation member coupled to said portion of said screw extending outwardly from said one end of said housing and configured to rotate said threaded screw about a vertical axis;
a support mounting member configured to couple said housing to a portion of the frame;
a height adjusting assembly, comprising:
first apertures exposed from an exterior surface of said housing, said first apertures spaced at a distance from each other in a vertical direction during said use of said trailer tow assist apparatus,
at least one second aperture in said support mounting member, said at least one aperture that aligns with one first aperture from said first apertures during said use of said trailer tow assist apparatus, and
a pin passed, during said use of said trailer tow assist apparatus, through said at least one second aperture aligned with said one first aperture;
a rigid member comprising a first end and a second end spaced from said first end in said vertical direction during said use of said trailer tow assist apparatus;
a connection between one of said first end and said second end of said rigid member and said wheel mounting member so that said rigid member upstands on said wheel mounting member during said use of said trailer tow assist apparatus and where another one of said first end and said second end of said rigid member is disposed within said housing;
a resilient member disposed in a contact with said another one of said first end and said second end of said rigid member within said housing; and
a level member mounted on a tow bar or on a portion of the frame, said level member configured to define a generally leveled or a generally not-leveled condition of the frame in a relationship to the ground surface when the frame carries a load thereon and is supported on said wheel.

12. The trailer tow assist apparatus, of claim 11, wherein said level member is mounted on the frame.

13. The trailer tow assist apparatus, of claim 11, wherein said level member comprises bulb vial.

14. The trailer tow assist apparatus, of claim 11, wherein said level member comprises an electronic level.

15. The trailer tow assist apparatus of claim 11, wherein said level member being mounted on the tow bar.

16. The trailer tow assist apparatus of claim 11, wherein said level comprises an electric eye.

17. The trailer tow assist apparatus of claim 11, wherein said wheel is configured to withstand effects of towing the trailer with a load over an uneven terrain.

18. The trailer tow assist apparatus of claim 11, wherein said actuation member comprises an electric motor and a source of electric power coupled to said electric motor.

19. The trailer tow assist apparatus of claim 11, wherein said actuation member comprises a manually operable crank or a knob.

20. The trailer tow assist apparatus of claim 11, wherein said resilient member comprises a spring.

* * * * *